United States Patent [19]

Gardner et al.

[11] Patent Number: 4,707,246

[45] Date of Patent: Nov. 17, 1987

[54] HYDROTREATING CATALYST AND PROCESS

[75] Inventors: Lloyd E. Gardner; Stephen L. Parrott, both of Bartlesville, Okla.

[73] Assignee: Phillips Petroleum Company, Bartlesville, Okla.

[21] Appl. No.: 930,637

[22] Filed: Nov. 14, 1986

[51] Int. Cl.$^4$ ............................................. C10G 45/00
[52] U.S. Cl. ........................... 208/251 H; 208/216 R; 208/254 H
[58] Field of Search .......... 208/251 H, 216 R, 254 H, 208/254 R

[56] References Cited

U.S. PATENT DOCUMENTS

| | | | |
|---|---|---|---|
| 3,287,280 | 11/1966 | Dennis et al. | 502/211 |
| 3,755,148 | 8/1973 | Mickelson | 208/143 |
| 3,755,196 | 8/1973 | Mickelson | 252/435 |
| 3,840,472 | 10/1974 | Colgan et al. | 502/211 |
| 4,003,828 | 1/1977 | Eberly, Jr. | 208/216 R |
| 4,116,817 | 9/1978 | Frayer et al. | 208/210 |
| 4,148,717 | 4/1979 | Young | 208/251 H |
| 4,251,350 | 2/1981 | Johnson et al. | 208/216 R |
| 4,287,050 | 9/1981 | Eastman et al. | 208/215 |
| 4,313,820 | 2/1982 | Farha, Jr. et al. | 208/216 R |
| 4,333,855 | 6/1982 | Gardner et al. | 502/307 |
| 4,367,165 | 1/1983 | Asaoka et al. | 252/457 |
| 4,371,458 | 2/1983 | Eastman et al. | 252/439 |
| 4,371,728 | 2/1983 | Farha et al. | 585/258 |
| 4,376,698 | 3/1983 | Gardner et al. | 208/216 R |
| 4,389,304 | 6/1983 | Eastman et al. | 208/216 R |
| 4,389,305 | 6/1983 | Gardner et al. | 208/254 H |
| 4,422,960 | 12/1983 | Shiroto et al. | 502/206 |
| 4,444,655 | 4/1984 | Shiroto et al. | 208/210 |
| 4,483,764 | 11/1984 | Hensley, Jr. et al. | 208/251 H |
| 4,485,183 | 11/1984 | Miller et al. | 208/251 H |
| 4,495,062 | 1/1985 | Hensley, Jr. et al. | 208/251 H |
| 4,513,097 | 4/1985 | Angmorter et al. | 502/211 |
| 4,522,709 | 6/1985 | Aldag et al. | 208/216 R |
| 4,540,483 | 9/1985 | Simpson et al. | 208/216 R |
| 4,564,441 | 1/1986 | Kukes et al. | 208/216 PP |
| 4,581,129 | 4/1986 | Miller et al. | 208/216 R |
| 4,588,706 | 5/1986 | Kukes et al. | 208/254 H |
| 4,652,546 | 3/1987 | Aldag, Jr. et al. | 502/307 |
| 4,655,906 | 4/1987 | Bjornson et al. | 502/300 |

*Primary Examiner*—Andrew H. Metz
*Assistant Examiner*—Helane Myers
*Attorney, Agent, or Firm*—K. K. Brandes

[57] ABSTRACT

A catalyst composition comprises (a) alumina, (b) zinc titanate, (c) at least one compound of molybdenum, (d) at least one compound of at least one of nickel and cobalt, and (e) at least one compound containing phosphorus and oxygen. This catalyst composition is used for hydrotreating a liquid hydrocarbon-containing feed stream (such as a heavy oil) which contains compounds of nickel, vanadium and sulfur, under such conditions as to obtain a product having reduced levels of nickel, vanadium and sulfur.

13 Claims, 1 Drawing Figure

HYDROTREATING CATALYST AND PROCESS

BACKGROUND OF THE INVENTION

In one aspect, this invention relates to a catalytic hydrotreating process for removing metal and sulfur impurities from liquid hydrocarbon-containing feed streams. In a further aspect, this invention relates to a catalyst composition comprising alumina, zinc titanate and transition metal compounds.

Zinc titanate-containing catalyst compositions are known. Also the use of zinc titanate-containing catalyst compositions for hydrodesulfurizing hydrocarbon-containing feed streams, such as heavy crudes and fractions thereof, is known. However, there is an ever present need to improve zinc titanate-containing catalyst compositions and to use them in improved hydrotreating processes.

SUMMARY OF THE INVENTION

It is an object of this invention to provide a new, effective zinc titanate-containing catalyst composition. It is another object of this invention to hydrotreat a hydrocarbon-containing feed stream in the presence of a new, effective zinc titanate-containing catalyst composition. It is a further object of this invention to remove compounds of nickel, vanadium and sulfur from hydrocarbon-containing feed streams. Other objects and advantages will be apparent from the detailed description and the appended claims.

In accordance with this invention, a substantially liquid hydrocarbon-containing feed stream, which contains compounds of nickel, vanadium and sulfur as impurities, is hydrotreated in a process comprising the step of contacting said hydrocarbon-containing feed stream with hydrogen in the presence of a catalyst composition comprising (a) alumina, (b) zinc titanate, (c) at least one compound of molybdenum, (d) at least one compound selected from the group consisting of nickel compounds and cobalt compounds and (e) at least one compound containing phosphorus and oxygen, under such conditions as to obtain a hydrocarbon-containing product stream having reduced levels of nickel, vanadium and sulfur.

Also in accordance with this invention, a composition of matter is provided which comprises (a) alumina, (b) zinc titanate, (c) at least one molybdenum compound, (d) at least one compound selected from the groups consisting of nickel compound and cobalt compounds and (e) at least one compound containing phosphorus and oxygen. The preferred zinc titanate is $Zn_2TiO_4$. Preferably, the composition of matter of this invention is employed as a catalyst composition in the hydrotreating process of this invention. Also preferably, the composition of matter of this invention consists essentially of components (a), (b), (c), (d) and (e).

BRIEF DESCRIPTION OF THE DRAWING

FIG. I exhibits hydrodesulfurization activity curves for two catalysts.

DETAILED DESCRIPTION OF THE INVENTION CATALYST COMPOSITION

Figure 1:
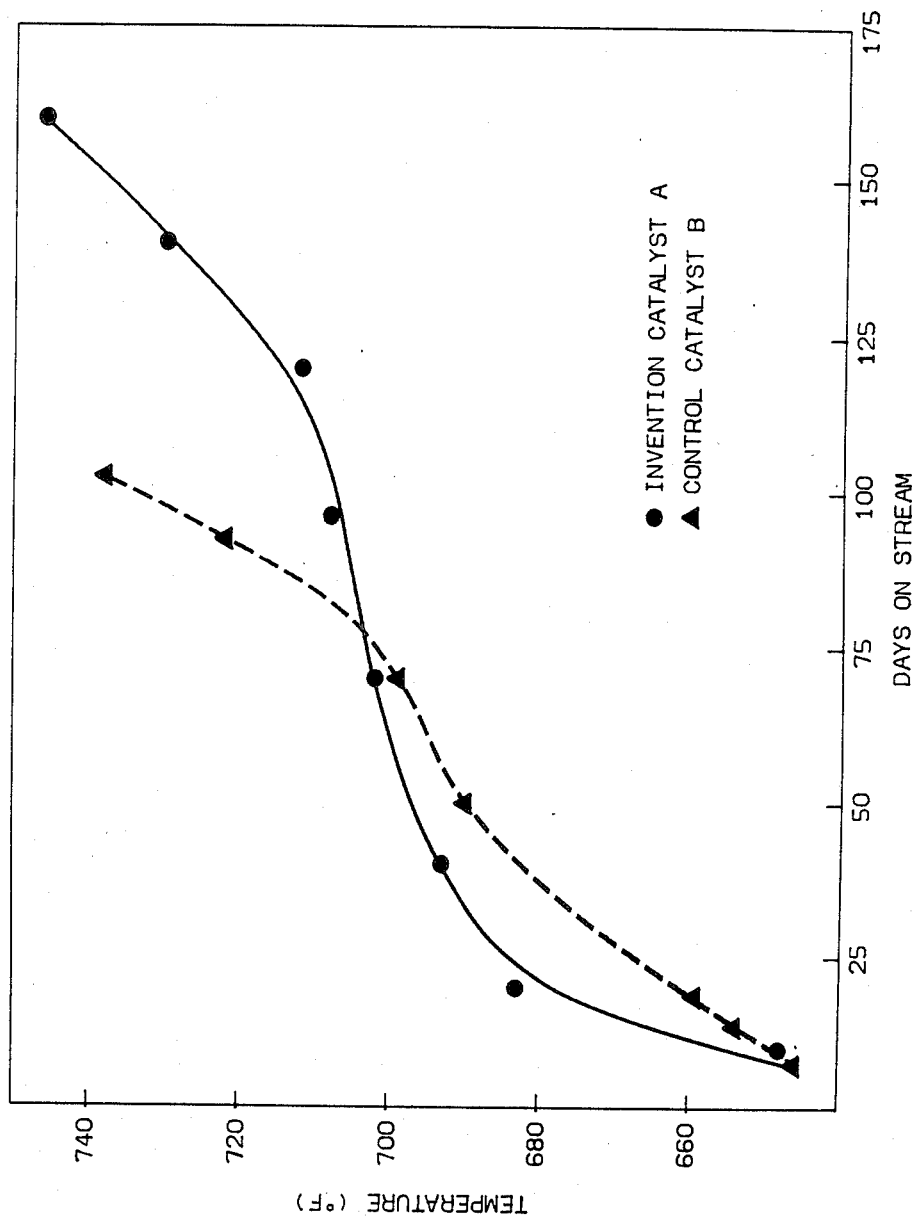

The composition of matter (catalyst composition) of this invention can contain any suitable proportions of components (a), (b), (c), (d) and (e). Preferably, the catalyst composition comprises (more preferably consists essentially of) from about 40 to about 90 weight-% (more preferably about 50–80 weight-%) $Al_2O_3$, from about 2 to about 20 weight-% (more preferably about 5.0–15 weight-%) zinc titanate, from about 1.0 to about 20 weight-% (more preferably about 2.0–15 weight-%) Mo, from about 0.5 to about 8.0 weight-% (more preferably about 1.0–5.0 weight-%) Ni or Co or Ni+Co (if both Ni and Co are present), and from 0.1 about to about 10.0 weight-% (more preferably about 0.3–3.0 weight-%) P. Even though the promoter levels (Mo, Ni and/or Co, P) are expressed as weight-% element, these promoters are generally present as oxides and/or phosphates. If the catalyst composition is presulfided, at least a portion of the promoter metals is present as sulfides. All weight percentages are calculated based on the finished (i.e., dried and calcined) composition of matter. The surface area of the composition of matter of this invention generally ranges from about 50 to about 400 m²/g, preferably from about 100 to about 250 m²/g (determined by the BET/$N_2$ method; ASTM D3037).

The composition of matter of this invention can be prepared by any suitable method. In one preferred embodiment, high surface area alumina and zinc titanate ($Zn_2TiO_4$) are mixed (preferably dry-blended as powders). The mixture can be impregnated with at least one aqueous solution of compounds of Mo, Ni and/or Co and P, dried, and calcined under such conditions and at a temperature high enough to at least partially convert the compounds of Mo, Ni and/or Co to their oxides and/or phosphates. Optionally, the mixture of $Al_2O_3$ and $Zn_2TiO_4$ can be impregnated as described above, then mixed with a liquid (e.g., $H_2O$), so as to form a paste, extruded, dried and calcined. The above described impregnation can be carried out sequentially in any order, or in one step using one solution containing compounds of Mo, Ni and/or Co and P. Preferably, the mixture of alumina and $Zn_2TiO_4$ (for the preparation of $Zn_2TiO_4$ see U.S. Pat. Nos. 4,287,050 and 4,371,728, herein incorporated by reference) is impregnated with a solution (more preferably aqueous), comprising compounds of Ni and/or Co and P in one step.

Any suitable compounds of Mo, Ni and/or Co and P can be used for the impregnation steps. Non-limiting examples of suitable molbdenum compounds are molybdic oxides and hydroxides, molybdenum blue, molybdic acids, ammonium orthomolybdates, alkali metal orthomolybdates, ammonium dimolybdates, alkali metal dimolybdates, ammonium heptamolybdates, alkali metal heptamolybdates, ammonium isomolybdates, alkali metal isomolybdates, and mixtures thereof. Non-limiting examples of compounds of nickel and/or cobalt are nitrates, sulfates, bisulfates, carbonates, bicarbonates, monocarboxylates (such as acetates), di- and tricarboxylates (such as oxalates and citrates), thiocyanates of Ni and/or Co, and mixtures thereof. Non-limiting compounds of phosphorus and oxygen are $H_3PO_4$, $H_4P_2O_7$, $(HPO_3)_n$, $NH_4H_2PO_4$, $LiH_2PO_4$, $NaH_2PO_4$, $KH_2PO_4$, $RbH_2PO_3$, $CsH_2PO_4$, $(NH_4)_2HPO_4$, $Li_2HPO_4$, $Na_2HPO_4$, $K_2HPO_4$, $Rb_2HPO_4$, $Cs_2HPO_4$, $(NH_4)_3PO_4$, $Na_3PO_4$, $K_3PO_4$, $Rb_3PO_4$, $Cs_3PO_4$, ammonium and alkali metal pyrophosphates, ammonium and alkali metal metaphosphates, $H_3PO_3$, ammonium and alkali metal phosphites. The amounts of the compounds of Mo, Ni and/or Co and P in the impregnating solutions are selected so as to attain desired weight percentages of these metals in the finished composition of matter. Preferably preferred compounds of Mo, Ni and P are $MoO_3$, $NiCO_3$ and $H_3PO_4$, respectively.

The drying step (after impregnation) is generally carried out at a temperature in the range of from about 25° to about 200° C. (preferably 50°-120° C.), either in air or in inert gas, either at ambient pressure conditions (about 1 atm) or (less preferably) under vacuum conditions. Generally, the dried composition of matter of this invention or one of its precursors contain less than about 20 weight-% water. The rate of drying is controlled so as to avoid surges of water vapor and splattering. Drying times can range from about 0.5 to about 100 hours (preferably 1-30 hours).

The calcining steps (after drying) comprise heating in a non-reducing atmosphere, either in a free oxygen containing gas (such as air) or (less preferably) in an inert gas atmosphere (e.g., nitrogen or helium), at a temperature in the range of from about 350° C. to about 750° C. (preferably from about 500° C. to about 650° C.). The time for calcining will generally range from about 0.1 to about 20 hours (preferably 0.5-10 hours). During calcining, substantially all volatile matter (water, carbonaceous material) is removed, and the compounds of Mo, Ni and/or Co and P are substantially converted to their oxides and/or phosphates.

When a powdered mixture of alumina/zinc titanate is used for impregnation, the impregnated and calcined composition of matter can be pelletized or compacted into various steps (e.g., spherical, cylindrical, trilobal) for convenient shipping and use in catalyst beds. Optionally, the composition of matter can be presulfided by contacting the calcined composition of matter with a suitable sulfur compound (such as $H_2S$, COS, mercaptans, disulfides), either in gaseous form or dissolved in a suitable solvent (such as a gas oil) so as to at least partially convert the oxides of Mo, Ni and/or Co to their sulfides. Presulfiding conditions comprise a temperature of about 200°-400° C., and a contacting time of about 1-30 hours.

It is within the scope of this invention (yet presently less preferred) to employ methods of preparing the composition of matter of this invention other than the one described above. For instance, Co/Mo-promoted mixtures of alumina and zinc titanate can be prepared in accordance with Example I of U.S. Pat. No. 4,287,050 or in accordance with Example I of U.S. Pat. No. 4,522,709, and these Co/Mo-promoted mixtures can then be impregnated with a phosphorus compound, dried and calcined.

HYDROTREATING PROCESS

The composition matter of this invention can be used as a catalyst composition for a variety of reactions such as hydrocarbon conversion reactions. In one preferred embodiment of this invention, the catalyst composition of this invention is used as a catalyst for hydrotreating substantially liquid hydrocarbon-containing feed streams, which also contain organic compounds of nickel, vanadium and sulfur impurities, and generally also asphaltenes, coke precursors (measured as Ramsbottom carbon residue) and nitrogen compounds. Suitable hydrocarbon containing feed streams include crude oil and fraction thereof, petroleum products, heavy oil extracts, coal pyrolyzates, liquefied coal products, products from tar sands, shale oil and shale oil products. The catalyst compositions are particularly suited for treating heavy topped crudes and heavy oil residua, which generally has an initial boiling point (at atmospheric pressure) in excess of about 400° F., preferably in excess of about 600° F., containing about 5-1000 ppmw (parts by weight per million by weight of hydrocarbon-containing feed) vanadium, about 3-500 ppmw nickel, about 0.5-7.0 weight-% sulfur, about 0.2-2.0 weight-% nitrogen and about 1-20 weight-% Ramsbottom carbon residue and having an $API_{60}$ gravity (measured at 60° F.) of about 5-25.

The hydrotreating process employing the catalyst composition of this invention can be carried out in any apparatus whereby an intimate contact of the catalyst composition with said hydrocarbon-containing feed stream and a free hydrogen containing gas is achieved, under such conditions as to produce a hydrocarbon-containing product having reduced levels of nickel, vanadium and sulfur. Generally, a lower level of nitrogen and Ramsbottom carbon residue and higher API gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrotreating process can be carried out as a batch process or, preferably, as a continuous process, more preferably in a tubular reactor containing one or more fixed catalyst beds or in a plurality of fixed bed reactors in parallel or in series. The hydrocarbon-containing product stream can be distilled, e.g., in a fractional distillation unit, so as to obtain fractions having different boiling ranges.

The catalyst composition of this invention can be used alone in the hydrotreating process of this invention or can be used in combination with substantially unpromoted refractory materials such as alumina, silica, titania, magnesia, metal silicates, metal aluminates, titania and metal phosphates. Alternating layers of the refractory material and of the catalyst composition can be used, or the catalyst composition can be mixed with the refractory material. Use of the refractory material with the catalyst composition provides for better dispersion of the hydrocarbon-containing feed stream.

Also, other catalysts such as known hydrotreating catalysts (e.g., $NiO/MoO_3$, $CoO/MoO_3$, $CoO/MoO_3$, $NiO/CoO/MoO_3$ and $NiO/MoO_3/TiO_2$, all supported by alumina) can be used in admixture with the catalyst composition of this invention to achieve simultaneous demetallization, desulfurization, and hydrocracking, if desired. It is also within the scope of this invention, to use a layer of the catalyst composition of this invention and one or more layers of these other hydrotreating catalysts in one reactor (stacked catalyst beds), or to use a reactor containing the catalyst invention in conjunction with one or more reactors in series containing these other hydrotreating catalysts, so as to achieve the simultaneous hydrotreating results as recited above. Preferably, the catalyst composition of this invention is used in the last (i.e., downstream) layer and reactor, respectively.

Any suitable reaction time (contact time) between the catalyst composition, the hydrocarbon-containing feed stream and hydrogen gas can be utilized. In general, the reaction time will range from about 0.05 hours to about 10 hours, preferably from about 0.4 to about 5 hours. In a continuous fixed bed operation, this generally requires a liquid hourly space velocity (LHSV) in the range of about 0.10 to about 10 cc of feed per cc of catalyst per hour, preferably from about 0.2 to about 2.5 cc/cc/hr.

The hydrotreating process employing the catalyst composition of the present invention can be carried out at any suitable temperature. The temperature will generally be in the range of about 250° C. to about 550° C. and will preferably be in the range of about 300° C. to about 450° C. Higher temperatures do improve the removal of impurities but temperatures which will have adverse effects on the hydrocarbon containing feed stream, such as excessive coking, will usually be avoided. Also, economic considerations will usually be taken into account in selecting the operating temperature.

Any suitable pressure may be utilized in the hydrotreating process. The reaction pressure will generally be in the range of about atmospheric pressure (0 psig) to up to 5,000 psig. Preferably, the pressure will be in the range of about 100 to about 2500 psig. Higher pressures tend to reduce coke formation, but operating at high pressure may be undesirable for safety and economic reasons.

Any suitable quantity of hydrogen can be added to the hydrotreating process. The quantity of hydrogen used to contact the hydrocarbon containing feed stock will generally be in the range of about 100 to about 10,000 standard cubic feed $H_2$ per barrel of the hydrocarbon containing feed stream and will more preferably be in the range of about 1,000 to about 5,000 standard cubic feet $H_2$ per barrel of the hydrocarbon containing feed stream. Either pure hydrogen or a free hydrogen containing gas mixture (e.g., $H_2$ and $CH_4$, or $H_2$ and CO, or $H_2$ and $N_2$) can be used.

In general, the catalyst composition is utilized primarily for demetallization and desulfurization. The time in which the catalyst composition of this invention will maintain its activity for the above process will depend upon the hydrotreating conditions and the catalyst composition of the hydrocarbon-containing feed. Generally, the temperature of the hydrotreating process is gradually increased to compensate for loss of catalyst activity due to fouling (e.g., due to deposition of coke and metals as the catalyst). The catalyst can, if desired, be regenerated when its activity has dropped below a desired level. Catalyst regeneration can be carried out by discontinuing the flow of hydrogen and of the hydrocarbon-containing feed streams and then heating the catalyst composition in a free oxygen containing gas atmosphere (such as air) under such conditions as to remove carbonaceous materials and to at least partially convert sulfides of Mo, Co and/or Ni back to their oxides and/or phosphates. Generally the catalyst regeneration step is carried out at about 400°–650° C. and at a pressure of about 0–1,000 psig.

At least a portion of the hydrotreated product stream of this invention can subsequently be cracked, e.g., in a fluidized catalytic cracking unit, under such conditions as to produce lower boiling hydrocarbon materials suitable for use as fuels and other useful products. It is within the scope of this invention to hydrotreat the product stream having reduced contents of metals and sulfur in a process using a different catalyst composition, such as alumina-supported $NiO/MoO_3$ or $CoO/MoO_3$ catalysts, for further removal of sulfur and other impurities (e.g., metals) before the product stream is introduced into a cracking reactor and treated under cracking conditions.

The following examples are presented in further illustration of the invention and are not to be considered as unduly limiting the scope of this invention.

EXAMPLE I

This example illustrates the preparation of various hydrotreating catalysts.

Invention Catalyst A was a Mo/Ni/P-impregnated zinc titanate/alumina mixture. A mixture of about 10 weight-% zinc titanate ($Zn_2TiO_4$) and about 90 weight-% alumina was dry-blended and extruded through a 1/16" diameter die. 25.8 grams of this extruded mixture was impregnated, under vacuum conditions, with 11.1 grams of an aqueous solution which was prepared by mixing 16.4 grams of $NiCO_3$, 51 grams of $MoO_3$, 9.8 grams of 85 weight-% $H_3PO_4$ (15 weight-% $H_2O$) and 100 grams of water under reflux conditions, with stirring. This solution contained 0.255 grams of Mo per grams solution, 0.608 grams Ni per grams solution and 0.263 grams of P per gram solution.

The thus impregnated Mo/Ni/P-impregnated $Zn_2TiO_4/Al_2O_3$ mixture was dried and then heated in air at 800° F. for about 3 hours. Calcined Catalyst A had a bulk density (i.e., density of poured material) of 0.960 g/cc and a surface area (determined by $BET/N_2$ method, ASTM D3037) of 170 $m^2/g$; and contained 9.0 weight-% Mo, 2.1 weight-% Ni and 1.0 weight-% P.

Control Catalyst B was Mo/Ni/P-impregnated alumina. Catalyst B was provided by Ketjen Catalysts Division of Akzona, Pasadena, TX under the product designated as KF-840. Catalyst B contained 11.6 weight-% Mo (as $MoO_3$), 2.8 weight-% Ni (as NiO) and 2.0 weight-% P (as phosphorus oxide); and had a $BET/N_2$ surface area (ASTM D3037) of 185 $m^2/g$. Catalyst B was calcined in air at 800° F. for 4 hours.

Control Catalyst C was Mo/Ni-impregnated zinc titanate/alumina. The zinc titanate/alumina mixture was prepared as described for Catalyst A. The impregnation was carried out substantially in accordance with the impregnation procedure for Catalyst A, except that no phosphorus compound was present in the impregnating solution. Catalyst C, which was dried and calcined in air at 1000° F., contained 7.1 weight-% Mo and 2.8 weight-% Ni, and had a $BET/N_2$ surface area of 172 $m^2/g$. Catalyst C contained no P.

Catalyst A and B were presulfided before use in hydrotreating runs 1 and 2 by heating in a gas mixture of $N_2$, $H_2$ and $H_2S$ (having a volume ratio of $N_2:H_2:H_2S$ of about 7:7:1 and a total flow rate of about 21 l/hr), first at 400° F. for 2 hours per 5 cc of catalyst, and then at 700° F. for 20 minutes per 5 cc of catalyst. Catalyst B and C were presulfided before use in test runs 3 and 4 by heating in a gas mixture of $H_2$ and $H_2S$, (having a volume ratio of $H_2:H_2S$ of about 9:1 and a total flow rate of about 0.5 standard cubic feet per hour), first at 400° F. for about 30 hours, and then at 700° F. for about 30 hours.

EXAMPLE II

This example illustrates the use of Catalyst A and B for hydrotreating a Hondo 400° F.+ residium, which contained about 93–104 ppm (parts by weight per million parts by weight of oil feed) nickel, about 236–264 ppmw vanadium, about 5.3–5.4 weight-% sulfur, about 0.71–0.78 weight-% nitrogen, and about 9.4–10.0 weight-% Ramsbottom carbon residue (ASTM D524), and had $API_{60}$ gravity of about 13.

The heavy oil feed was pumped downward through an induction tube into a trickle bed reactor, 28.5 inches long and 0.75 inches in diameter. The oil induction tube extended into a stacked, three-layer catalyst bed, the top of which was located about 3.5 inches below the reactor top. The top layer of the stacked catalyst bed contained a mixture of 23.5 cc of commercial Harshaw Catalyst 1 (containing 0.9 weight-% Co, 0.5 weight-% Ni, 7.5 weight-% Mo and alumina as support; BET/$N_2$ surface area: 174 $m^2$/g; pore volume, measured by mercury intrusion porosimetry at 15 kpsi: 0.62 cc/g; average pore diameter: 140 A; marketed by Harshaw/Filtrol Partnership, Cleveland, Ohio) and 23.5 cc of alundum alumina (having a surface area of less than 1 $m^2$/g; marketed by Norton Chemical Process Products, Akron, Ohio). The middle layer of the stacked bed contained a mixture of 23.5 cc of commercial Harshaw Catalyst 2 (containing 3.1 weight-% Ni, 7.9 weight-% Mo, 4.6 weight-% Ti and alumina as support; BET/$N_2$ surface area: 140 $m^2$/g; pore volume by mercury porosimetry: 0.65 cc/g; average pore diameter: 125 A; marketed by Harshaw/Filtrol Partnership) and 23.5 cc of alundum. The bottom layer of the stacked catalyst bed contained a mixture of 23.5 cc of either Catalyst A or B and 23.5 cc of alundum. The three-layer catalyst bed was presulfided, as described in Example I.

After presulfiding, hydrogen gas was introduced into the reactor through a tube that concentrically surrounded the oil induction tube but extended only as far as the reactor top. The reactor was heated with a Thermcraft (Winston-Salem, N.C.) Model 211 3-zone furnace. The reactor temperature was measured in the catalyst bed at three different locations by three separate thermocouples embedded in an axial thermocouple well (0.25 inch outer diameter). The liquid product oil was generally collected every day for analysis. The hydrogen gas was vented. Vanadium and nickel contents were determined by plasma emission analysis; sulfur content was measured by X-ray fluorescence spectrometry; nitrogen content was measured in accordance with ASTM D3228; and Ramsbottom carbon residue was determined in accordance with ASTM D524.

The test runs were carried out at a liquid hourly space velocity (LHSV) of the oil feed of about 0.35 cc/cc catalyst/hour, a pressure of 2250 psig, a hydrogen feed rate of 3500 standard cubic feet per barrel oil (SCF/B), and a temperature of 650°-700° C. Pertinent process parameters and results are summarized in Table I, for short-term catalyst activity comparison.

TABLE I

| Reaction Temp. (°F.) | Catalyst | Hours on Stream | LHSV (cc/cc/hr) | %-Removal of Ni + V | of S |
|---|---|---|---|---|---|
| 650 | A (Invention) | 57 | 0.36 | 83 | 86 |
| 650 | B (Control) | 55 | 0.36 | 77 | 84 |
| 675 | A (Invention) | 159 | 0.35[1] | 89[1] | 90[1] |
| 675 | B (Control) | 205 | 0.35[2] | 83[2] | 86[2] |
| 700 | A (Invention) | 97 | 0.31 | 98 | 98 |
| 700 | B (Control) | 82 | 0.35 | 93 | 96 |

[1]average of 5 samples
[2]average of 4 samples
Note: The products from these runs contained about 0.2-0.4 weight-% N, and about 1-4 weight-% Ramsbottom carbon residue, and had $API_{60}$ gravity of about 25-32.

Test data in Table I clearly show the superiority of Invention Catalyst A (Mo/Ni/P/$Zn_2TiO_4$/$Al_2O_3$) over Control Catalyst B (Mo/Ni/P/$Al_2O_3$), in terms of removal of metals (nickel+vanadium) and of sulfur from the heavy oil feed, at comparable reaction temperatures and flow rates (LHSV).

EXAMPLE III

This example illustrates long-term hydrotreating tests using the same heavy oil feed and the same stacked catalyst beds as described in Example II. However, these tests were conducted at increasing temperature conditions so as to attain a product having a constant sulfur content of 0.9 weight-% S (i.e., sulfur removal was about 87%).

Test data, which are plotted in FIG. I, clearly show that Invention Catalyst A retained its desulfurization activity for a longer period of time than Control Catalyst B. For example, after 100 days on stream, the reaction temperature required for achieving 87% removal of S was about 710° F. for Invention Catalyst A, but was about 20° F. higher for Control Catalyst B. After about 125 days on stream, Invention Catalyst A still achieved 87% desulfurization at about 720° F., whereas Control Catalyst B was substantially deactivated.

EXAMPLE IV

This example illustrates the use of Catalyst B and C for hydrotreating a 650F.+ Arabian light residium, which contained 12 ppm Ni, 42 ppm V, 3.0 weight-S and 7.7 weight-% Ramsbottom carbon residue, and had $API_{60}$ gravity of 16.6. The hydrotreating procedure for runs of this example was essentially the same as the one described in Example III, with the exception that only a single catalyst bed was employed containing 70 cc of a catalyst and 70 cc of alundum. Pertinent process conditions and test results are summarized in Table II.

TABLE II

| Reaction Temp. (°F.) | Catalyst | Hours on Stream | LHS (cc/cc/hr) | %-Removal of (Ni + V) | of S |
|---|---|---|---|---|---|
| 630 | B | 30 | 0.35 | 51 | 76 |
| 630 | C | 30 | 0.39 | 61 | 65 |
| 650 | B | 61 | 0.35 | 54 | 81 |
| 650 | C | 61 | 0.37 | 65 | 73 |
| 670 | B | 92 | 0.35 | 59 | 87 |
| 670 | C | 92 | 0.36 | 74 | 79 |
| 690 | B | 168 | 0.37 | 61 | 90 |
| 690 | C | 168 | 0.37 | 81 | 86 |
| 710 | B | 152 | 0.37 | 66 | 91 |
| 710 | C | 152 | 0.34 | 86 | 91 |
| 730 | B | 183 | 0.38 | 80 | 95 |
| 730 | C | 183 | 0.37 | 90 | 94 |

Note: The products from these runs contained about 0.03-0.09 weight-% N and about 1-5 weight-% Ramsbottom carbon residue, and had $API_{60}$ gravity of about 21-28. All data are averages of two samples, with the exception of data for 690° F. which are averages of four samples.

Table II shows that Catalyst B (Mo/Ni/P/$Al_2O_3$) was more effective than Catalyst C (Mo/Ni/$Zn_2TiO_4$/$Al_2O_3$) in removing sulfur from the heavy oil feed, at comparable temperatures and feed rates (LHSV). Based on these results and on the results of Table I (which indicated desulfurization superiority of A versus B), it is clearly evident that Invention Catalyst A (Mo/Ni/P/$Zn_2TiO_4$/$Al_2O_3$) was a more active desulfurization catalyst than Control Catalyst C (Mo/Ni/$Zn_2TiO_4$/$Al_2O_3$; no P).

Reasonable variations and modifications can be made in this invention without departing from the spirit and scope thereof.

We claim:

1. A process for hydrotreating a substantially liquid hydrocarbon-containing feed stream, which also contains compounds of nickel, vanadium and sulfur, comprising the steps of contacting said hydrocarbon-containing feed stream with hydrogen in the presence of a catalyst composition comprising
   (a) alumina,
   (b) zinc titanate,
   (c) at least one compound of molybdenum,
   (d) at least one compound of nickel, and
   (e) at least one compound containing phosphorus and oxygen,
   under such hydrotreating conditions as to obtain a hydrocarbon-containing product stream having reduced levels of nickel vanadium and sulfur.

2. A process in accordance with claim 1, wherein said feed stream contains from about 0 5 to about 7.0 weight-%S, from about 3 to about 500 ppmw Ni, and from about 5 to about 1000 ppmw V.

3. A process in accordance with claim 2, wherein said feed stream also contains about 0.2-2.0 weight-% N and about 1-20 weight-% Ramsbottom carbon residue, and has $API_{60}$ gravity of about 5-25.

4. A process in accordance with claim 1, wherein said hydrotreating conditions comprise a reaction time in the range of from about 0.05 to about 10 hours, a temperature in the range of from about 250° to about 550° C., a pressure in the range of from about 0 to about 5,000 psig, and a quantity of added hydrogen in the range of from about 100 to about 10,000 standard cubic feed of $H_2$ per barrel of hydrocarbon-containing feed.

5. A process in accordance with claim 1, wherein said hydrotreating conditions comprise a reaction time in the range of from about 0.4 to about 5.0 hours, a temperature in the range of from about 300° to about 450° C., a pressure in the range of from about 100 to about 2,500 psig, and a quantity of added hydrogen in the range of from about 1,000 to about 5,000 standard cubic feet of hydrogen per barrel of hydrocarbon-containing feed.

6. A process in accordance with claim 1 wherein said catalyst composition comprises from about 40 to about 90 weight-% $Al_2O_3$, from about 2.0 to about 20 weight-% zinc titanate, from about 1.0 to about 20 weight-% Mo, from about 0.5 to about 8.0 weight-% of Ni, and from about 0.1 to about 10.0 weight-% P, and the surface area of said catalyst composition is in the range of from about 50 to about 400 $m^2/g$.

7. A process in accordance with claim 1, wherein said catalyst composition comprises from about 50 to about 80 weight-% $Al_2O_3$, from about 5.0 to about 15 weight-% zinc titanate, from about 2.0 to about 15 weight-% Mo, from about 1.0 to about 5.0 weight-% of Ni, and from about 0.3 to about 3.0 weight-% P, and the surface area of said catalyst composition is in the range of from about 100 to about 250 $m^2/g$.

8. A process in accordance with claim 1, wherein said catalyst composition has been presulfided.

9. A process in accordance with claim 1 comprising the additional steps of:
   discontinuing the flow of hydrogen and of the hydrocarbon-containing feed stream, and heating the catalyst composition in a free oxygen-containing gas atmosphere under such conditions as to remove carbonaceous materials therefrom.

10. A process in accordance with claim 9, wherein said heating in a free oxygen-containing gas atmosphere is carried out at a temperature in the range of from about 400° to about 650° C.

11. A process in accordance with claim 1, wherein said catalyst composition has been prepared by a process comprising the steps of:
    (i) mixing alumina and zinc titanate;
    (ii) impregnating the mixture of alumina and zinc titanate obtained in step (i) with an aqueous solution containing at least one compound of Mo, of at least compound of Ni, and at least one compound containing P and O;
    (iii) drying the thus impregnated mixture obtained in step (ii); and
    (iv) calcining the dried mixture obtained in step (iii) under such conditions and at a temperature high enough to convert said at least one compounds of Mo to at least one of oxides and phosphates of Mo, and said at least one compound of Ni to at least one of oxides and phosphates of Ni.

12. A process in accordance with claim 11, wherein said calcining is carried out in a free oxygen containing gas at a temperature in the range of from about 350° to about 750° C.

13. A process in accordance with claim 11 wherein the aqueous solution used in step (ii) is prepared by mixing $MoO_3$, $NiCO_3$, $H_3PO_4$ and water.

* * * * *